United States Patent [19]
Schwartz et al.

[11] Patent Number: 5,742,014
[45] Date of Patent: Apr. 21, 1998

[54] MULTI-FUNCTION STEERING COLUMN STALK SWITCH

[75] Inventors: Allen K. Schwartz, Oxford; Dennis J. Fitzpatrick, Berkley, both of Mich.

[73] Assignee: ITT Automotive, Inc., Auburn Hills, Mich.

[21] Appl. No.: 714,925

[22] Filed: Sep. 11, 1996

[51] Int. Cl.$^6$ ............................... H01H 3/16; H01H 9/00
[52] U.S. Cl. ........................... 200/61.27; 200/61.54
[58] Field of Search ............... 200/4, 6 R, 61.27–61.38, 200/61.54

[56] References Cited

U.S. PATENT DOCUMENTS

| | | |
|---|---|---|
| 3,719,787 | 3/1973 | Tomelek . |
| 3,892,932 | 7/1975 | Erdelitsch et al. . |
| 3,934,101 | 1/1976 | Jones . |
| 3,940,579 | 2/1976 | Bühl et al. . |
| 4,129,757 | 12/1978 | Cryer . |
| 4,219,706 | 8/1980 | Koch et al. . |
| 4,273,971 | 6/1981 | Tregurtha . |
| 4,293,743 | 10/1981 | Iwata et al. . |
| 4,327,264 | 4/1982 | Botz et al. . |
| 4,336,428 | 6/1982 | Berginski . |
| 4,376,236 | 3/1983 | Long et al. . |
| 4,379,954 | 4/1983 | Iwata et al. . |
| 4,387,279 | 6/1983 | Brevick . |
| 4,400,598 | 8/1983 | Janol et al. . |
| 4,648,728 | 3/1987 | Erdelitsch et al. . |
| 4,678,875 | 7/1987 | Erdelitsch et al. . |
| 4,723,057 | 2/1988 | Lane, Jr. . |
| 4,739,130 | 4/1988 | Roller et al. . |
| 4,791,253 | 12/1988 | Erdelitsch et al. . |
| 4,810,839 | 3/1989 | Chretien . |
| 4,882,457 | 11/1989 | Erdelitsch et al. . |
| 4,920,239 | 4/1990 | Bühler . |
| 5,049,706 | 9/1991 | Durocher . |
| 5,120,914 | 6/1992 | Kerner et al. . |
| 5,170,884 | 12/1992 | Hauk . |
| 5,453,588 | 9/1995 | DuRocher et al. .......... 200/61.54 |
| 5,610,378 | 3/1997 | DuRocher et al. .......... 200/61.27 |

FOREIGN PATENT DOCUMENTS

| | | |
|---|---|---|
| 2018027 | 10/1979 | United Kingdom . |
| 2135126 | 8/1984 | United Kingdom . |

*Primary Examiner*—Matthew V. Nguyen
*Attorney, Agent, or Firm*—Thomas N. Twomey; J. Gordon Lewis

[57] ABSTRACT

A steering column stalk switch includes a lever gimballed for rotation relative to a housing in two different paths of movement. First and second electrical contactors are mounted on a support for engagement with conductive traces on a circuit board stationarily mounted in the housing. An actuator on the lever engages the support upon movement of the lever in one path of movement to laterally move the support to switch the position of one of the first and second contactors relative to the conductive traces on the circuit board. Movement of the lever in a different direction rotates the support to switch the other contactor relative to the conductive traces on the circuit board.

24 Claims, 12 Drawing Sheets

FIG·10

MULTI-FUNCTION STEERING COLUMN STALK SWITCH

BACKGROUND OF THE INVENTION

1. Field of the Invention

The present invention relates, in general, to vehicle steering column mounted switches for controlling various vehicle devices.

2. State of the Art

The evolution of steering column switches in motor vehicles has been toward greater integration of functions in a single switch. Previously, a plurality of individual switches, each controlling a single function, i.e., turn signals, windshield wipers, etc., were mounted on the vehicle dashboard or steering column. Current steering column switches are designed to control a variety of functions or vehicle operating circuits, for example, turn signals/ hazard lights, high beam and low beam headlights with optional flash-to-pass, parking lights, and windshield wiper and wash functions, including multi-speed wipers with or without delay.

Typically, a steering column switch includes a single lever or stalk pivotally mounted on one side of a housing attached to the steering column in an easily accessible position for the driver of the vehicle. The lever is gimballed at one end in the housing so as to move in one of two mutually separate planes. Further, the lever may be provided with a rotatable end cap a slidable member movable along the longitudinal axis of the lever and/or a pushbutton mounted in the outer end of the lever. Actuators are mounted in the housing and, in response to movement of the lever in one direction, i.e., such as in one of the two mutually separate planes, rotation of the end cap, movement of the slidable member or pushbutton, move a switching member carrying contacts between various switching positions to effect the switching of electrical connections for a particular vehicle operating circuit. The particular vehicle operating circuit or device controlled by each switch in the steering column switch assembly is established by the vehicle manufacturer and may vary from vehicle to vehicle.

SUMMARY OF THE INVENTION

The present invention is a multi-function steering column stalk switch apparatus mountable on a steering column of a motor vehicle for controlling various operating circuits and devices in the vehicle.

The multi-function steering column stalk switch includes a housing detachably mounted to a steering column. A lever is movably attached to the housing for movement in two separate planes. A circuit board is stationarily mounted in the housing and carries a plurality of conductive traces. First and second members are mounted adjacent to the circuit board and coupled together for unitary movement. A first contact means is carried on the first member for engaging conductive traces on the circuit board in response to movement of the first member. A second contact means is carried on the second member for engaging other conductive traces on the circuit board in response to movement of the second member. An actuator is carried with the lever and engagable with the first and second members. Means, coacting between the actuator and the first and second members, are provided for moving the first member to switch the first contact means between conductive traces on the circuit board in response to movement of the lever in one of the two planes, and for moving the second member to switch the second contact means between conductive traces on the circuit board in response to movement of the lever in a second plane.

Preferably, the coacting means comprises the first member mounted for linear movement and the second member mounted for rotation.

In one embodiment, connector means are provided for fixedly joining the first and second members together. A first aperture is formed in the circuit board with the connector means extending therethrough for lateral movement in the first aperture. A second aperture is also formed in the circuit board. The actuator passes freely through the second aperture into engagement with the second member to cause rotation of the second member about the connector means in response to movement of the lever in one path of movement.

The connector means exemplarily comprises a tubular member carried with and extending from the second member. The tubular member is received in an aperture formed in the first member. Lock means, carried on the tubular member, are engagable with the first member to fixedly join the first and second members together.

In another embodiment, the actuator passes by one edge of the printed circuit board mounted in the housing and through an aperture formed in a carrier carrying one of the contactors. A crank fixedly carries the other contactor and is rotatably mounted on the carrier in between the two contactors. Upon rotation of the lever and the actuator in one plane, the actuator engages the crank causing rotation of the crank and switching of one of the contactors. Movement of the lever and the actuator in another plane, generally perpendicular to the first plane, causes linear translation of the carrier within the housing effecting lateral switching movement of the other contactor.

The actuator extends into engagement with a detent formed in a detent block mounted in the housing. The detent provides a plurality of distinct paths along which the actuator may move upon pivotal movement of the lever. The detent paths are angled to automatically return the actuator and the lever to a normal centered position upon release by a user.

The multi-function steering column stalk switch of the present invention has a unique contactor mounting structure in which a carrier carrying a first electrical contactor and a crank carrying a second electrical contactor are movably disposed relative to a circuit board carrying conductive traces which is fixedly mounted in the housing of the stalk switch. This arrangement provides switching of the contactors in response to multi-axis pivoting of the stalk lever.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
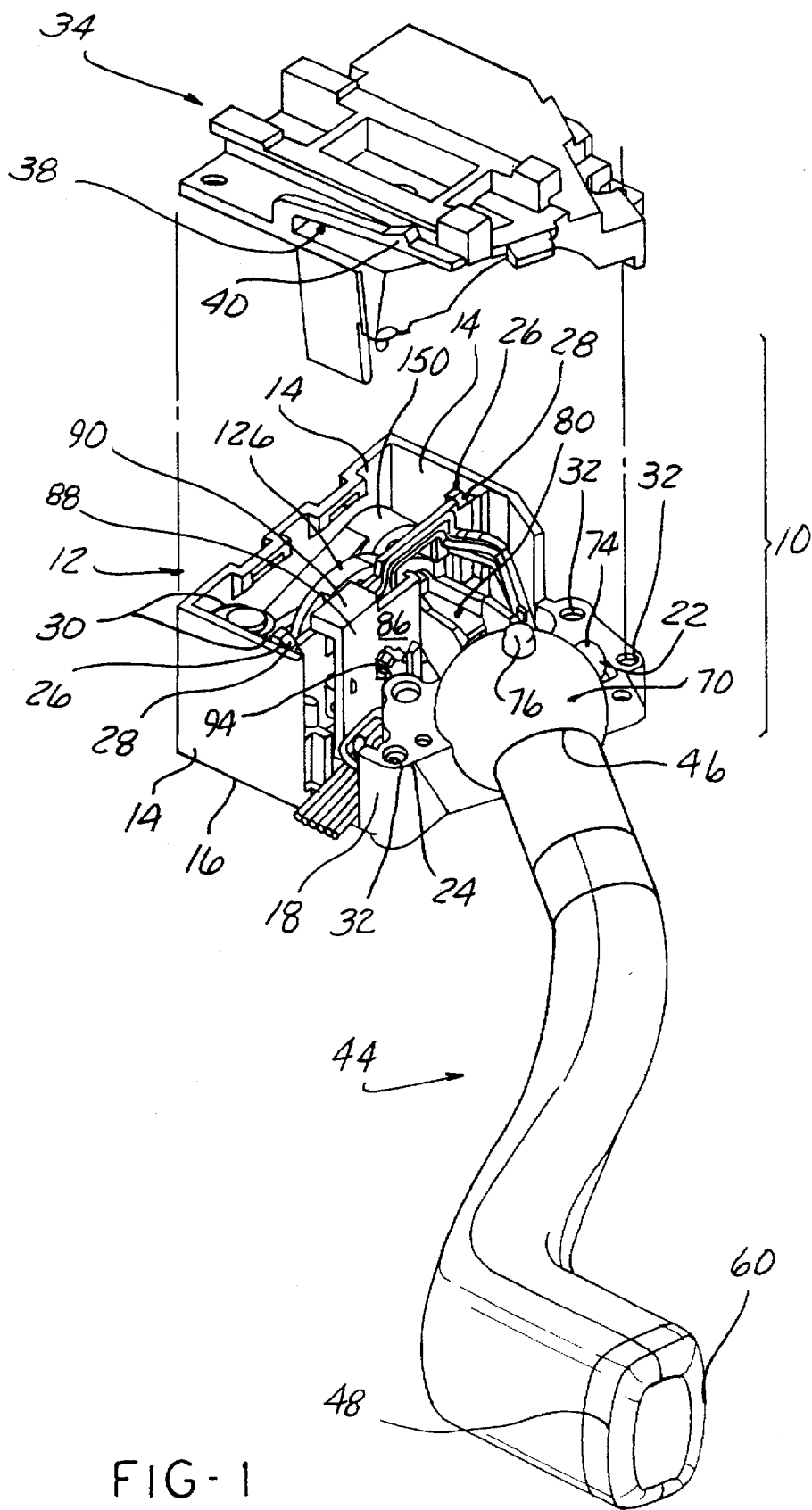
FIG. 1 is a partially exploded, perspective view of an assembled multi-function steering column stalk switch according to one embodiment of the present invention.
Figure 2:
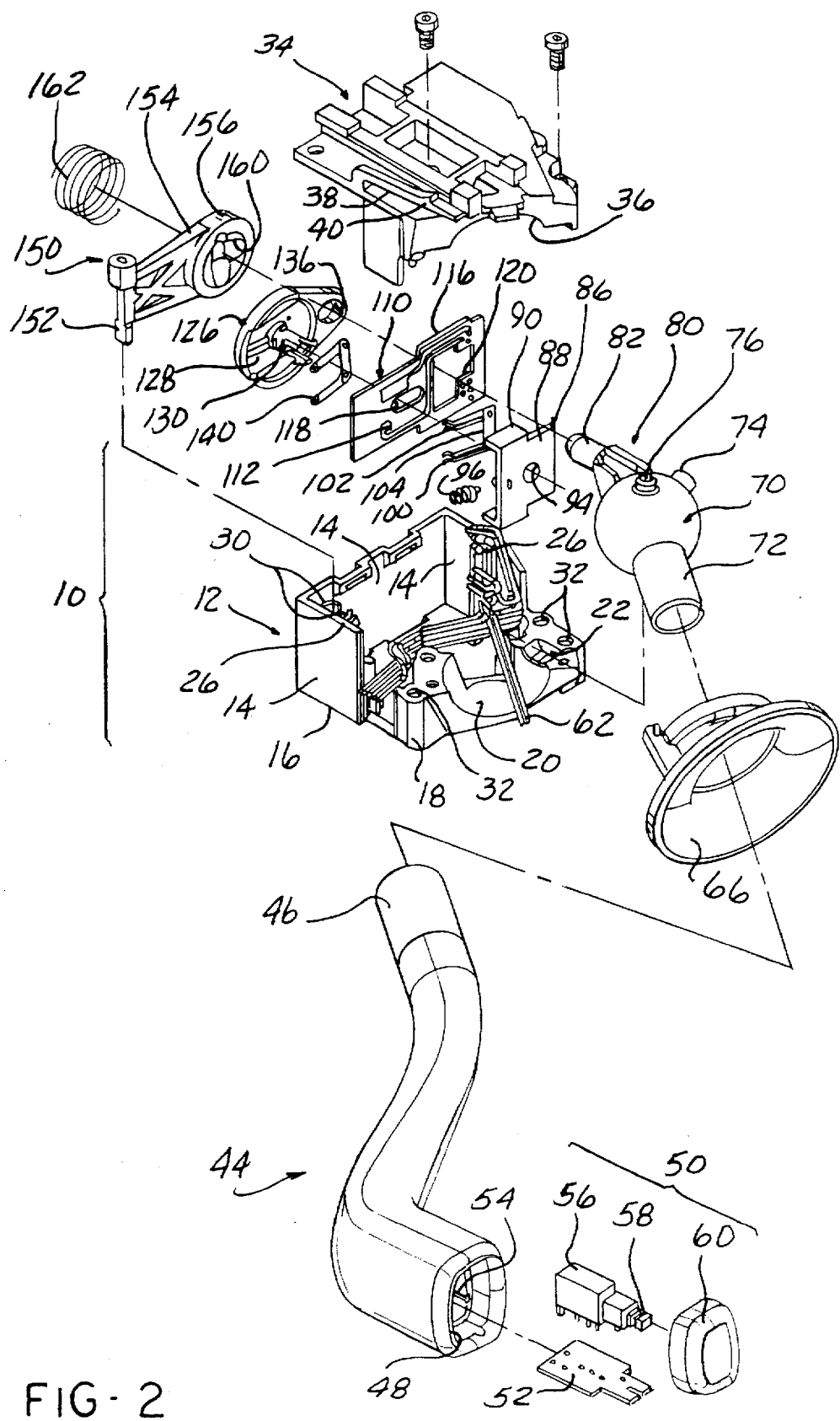
FIG. 2 is an exploded, perspective view of the multi-function steering column stalk switch shown in FIG. 1.
Figure 3:
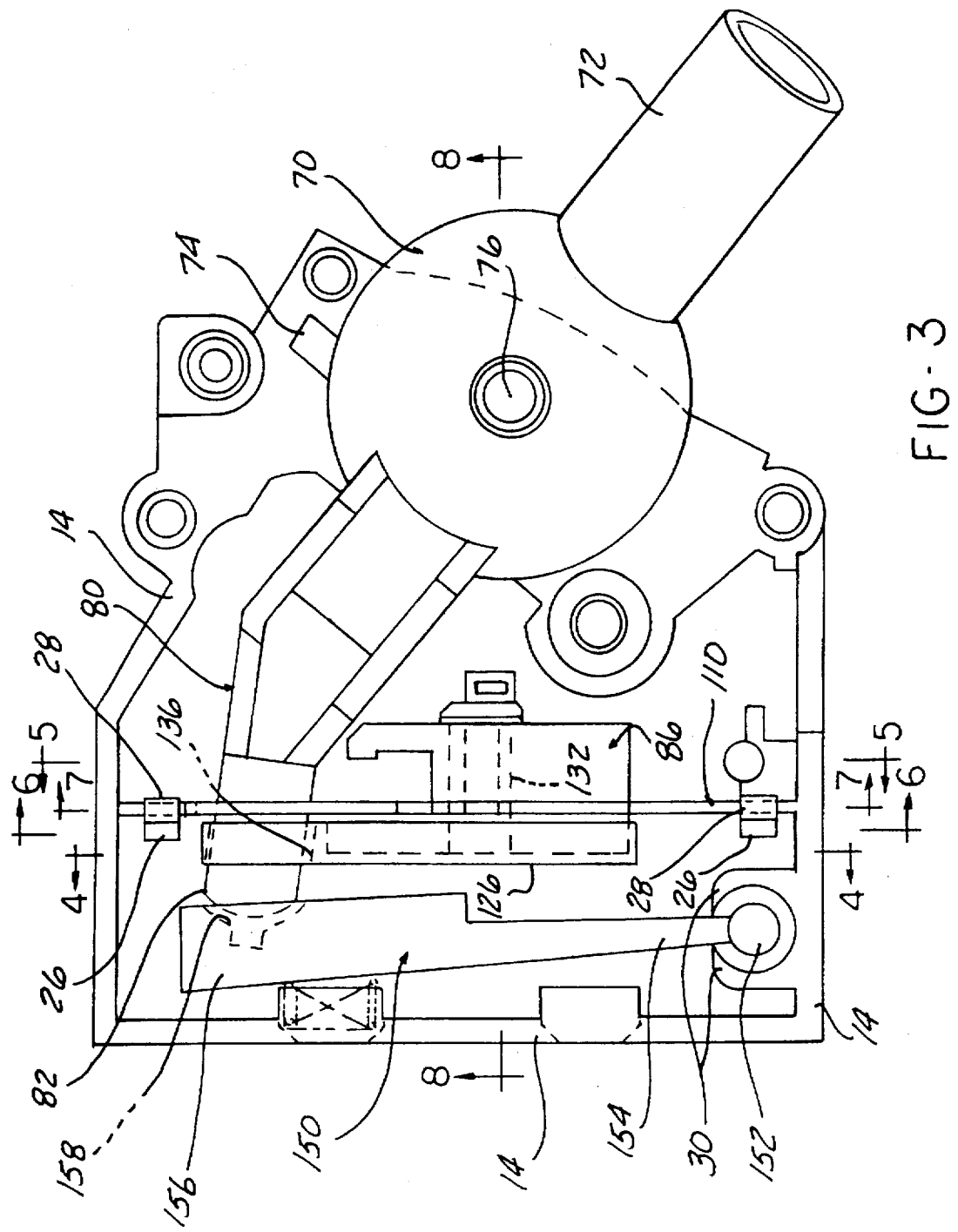
FIG. 3 is a plan elevational view of the multi-function steering column stalk switch shown in FIG. 1, with the top cover removed.

Referring now to the drawing, and to FIGS. 1, 2 and 3 in particular, there is depicted a multi-function steering column stalk switch 10 constructed according to the teachings of one embodiment of the present invention.

The multi-function steering column stalk switch 10, hereafter referred to simply as the stalk switch 10, includes a housing 12 having three interconnected side walls 14 and a bottom wall 16. A bottom extension 18 extends outward from two of the side walls 14. A ball seat 20 is formed in the extension 18 as shown in FIG. 2. A pivot pin receiver or recess 22 is formed adjacent one edge of the seat 20.

In addition, a pair of spaced latch posts 26 project from the bottom wall 16 and are disposed adjacent to two of the spaced side walls 14. Each latch post 26 terminates in a latch finger 28 which is adapted for fixedly mounting a circuit board in the housing 12 as also described hereafter. A pair of spaced, generally semi-circular members 30 also project from the bottom wall 16 adjacent to one side wall 14. Various bores 32 are formed in the bottom extension 18 for receiving fasteners extending through aligned bores formed in a top cover 34 to removably secure the top cover 34 to the housing 12.

As shown in FIGS. 1 and 2, the top cover 34 is shaped to enclose the open top of the housing 12 and has a complimentary shaped end portion designed to mate with the bottom extension 18 on the housing 12. A semi-circular seat 36 is formed in the end of the top cover 34 and cooperates with the seat 20 in the housing 12 to form a receiver for a gimbal ball attached to the switch lever as described hereafter. Although not shown, two pivot pin receivers are formed in the seat 36 for receiving two pivot pins mounted on the gimbal ball.

A latch arm 38 is pivotally mounted on the top cover 34 and includes a projection 40 designed to releasibly engage a mating latch receiver formed in a housing, not shown, which is mounted on a steering column for mounting the stalk switch 10 to a vehicle steering column.

As also shown in FIGS. 1 and 2, a lever 44 is pivotally mounted to the housing 12. The lever 44 has a generally elongated, tubular form with a hollow interior chamber extending between opposed first and second ends 46 and 48.

By way of example only, a first switch assembly denoted generally by reference number 50 is mounted in the second end 48 of the lever 44. The first switch assembly 50 includes a printed circuit board 52 which is slidably mounted in slots 54 extending inward from the second end 48 of the lever 44. A switch 56 is mounted on the printed circuit board 52. Any suitable switch 56 may be employed which includes a movable operator 58 which receives a pushbutton 60 in a snap-on connection. The operator 58, upon movement of the pushbutton 50 into the end 48 of the lever 44, causes internal contacts in the switch 58 to switch positions thereby making a connection between various conductive traces formed on the printed circuit board 52. Conductors 62 are connected to terminals on the printed circuit board 52 and extend through the lever 44 to the housing 12 as shown in FIG. 2 and are connected at an opposite end to an electrical circuit or device.

A protective cone or boot 66 is mounted about the lever 44, generally in proximity with the first end 46, to close off the connection between the first end 46 of the lever 44 and the housing 12.

A gimbal ball 70 has a tubular sleeve 72 extending therefrom as shown in FIGS. 1–3. The sleeve 72 is sized to be received within the first end 46 of the lever 44 to attach the gimbal ball 70 to the lever 44.

A first pivot pin 74 also projects from the ball 70. A second pivot pin 76 also projects from the ball 70 at a position spaced 90° from the first pin 74. Tile first pin 74 seats within pivot pin receiver 22 formed in the bottom extension 18 of the housing 12 and a mating receiver formed in the end of the top cover 34 to enable pivotal movement of the lever 44 in a first plane perpendicular to a longitudinal axis extending through the first pivot pin 74. Similarly, the second pivot pin 76 seats within a receiver formed in the end of the top cover 34 and enables pivotal movement of the lever 44 in a second, mutually separate plane perpendicular to a longitudinal axis extending through the second pivot pin 76.

An actuator denoted generally by reference number 80 projects from the ball 70 and terminates in a post 82 having a generally spherical or rounded end.

Figure 8:
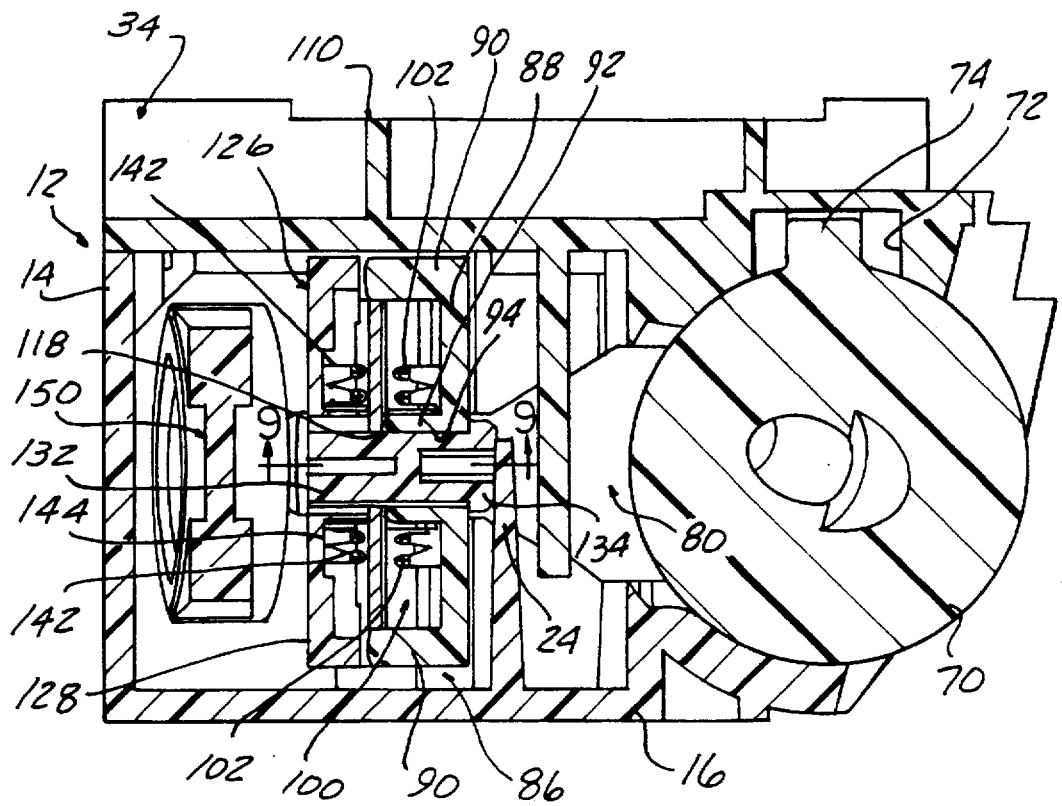
FIG. 8 is a cross sectional view generally taken along line 8—8 in FIG. 3.
Figure 9:
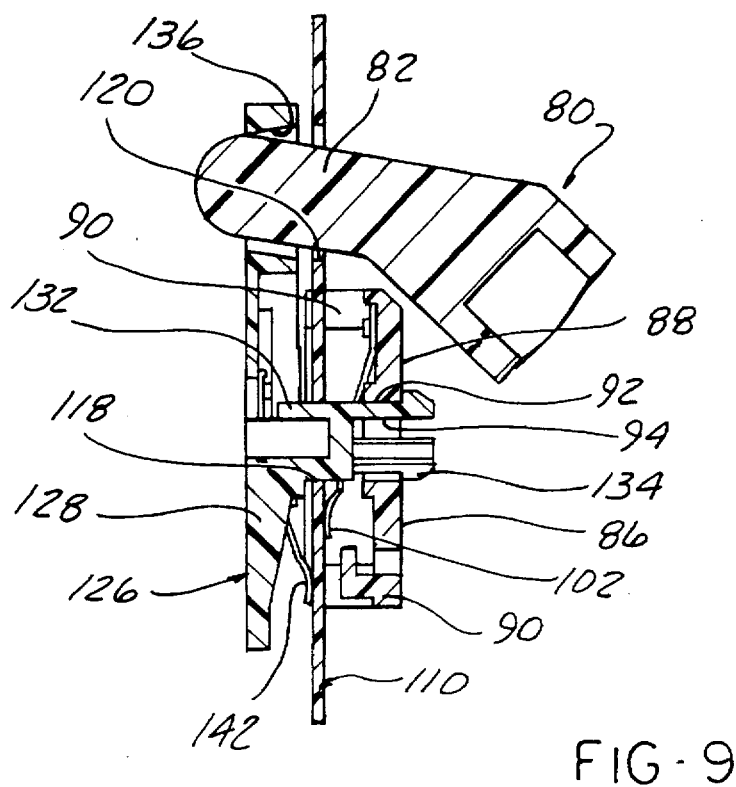
FIG. 9 is a cross sectional view generally taken along line 9—9 in FIG. 8.

As shown generally in FIGS. 1–3, and in greater detail in FIGS. 8 and 9, a carrier 86 is disposed in the housing 12. The carrier 86 is formed with a base 88 and a pair of spaced side walls 90 projecting generally perpendicularly from the base 88. A tubular sleeve 92 also projects from the base 88 generally parallel to the side walls 90 and has a through bore 94 extending therethrough. A biasing means, such as an extension coil spring 96, is seated between the side wall 14 of the housing 12 and the sleeve 92 for biasing the carrier 86 to a first, normal position, as described hereafter.

A first contactor 100 is fixedly mounted on the carrier 86 on the inner surface of the base 88 between the side walls 90 as shown in FIGS. 2, 3, 5, 8 and 9. The first contactor 100, by example only, is in the form of a pair of leaf contacts 102 interconnected by a common base 104. The contacts 102 cantilever away from the base 104. Further, each of the contacts 102 may be bifurcated into two separate portions as shown in FIGS. 2 and 8.

Figure 5:
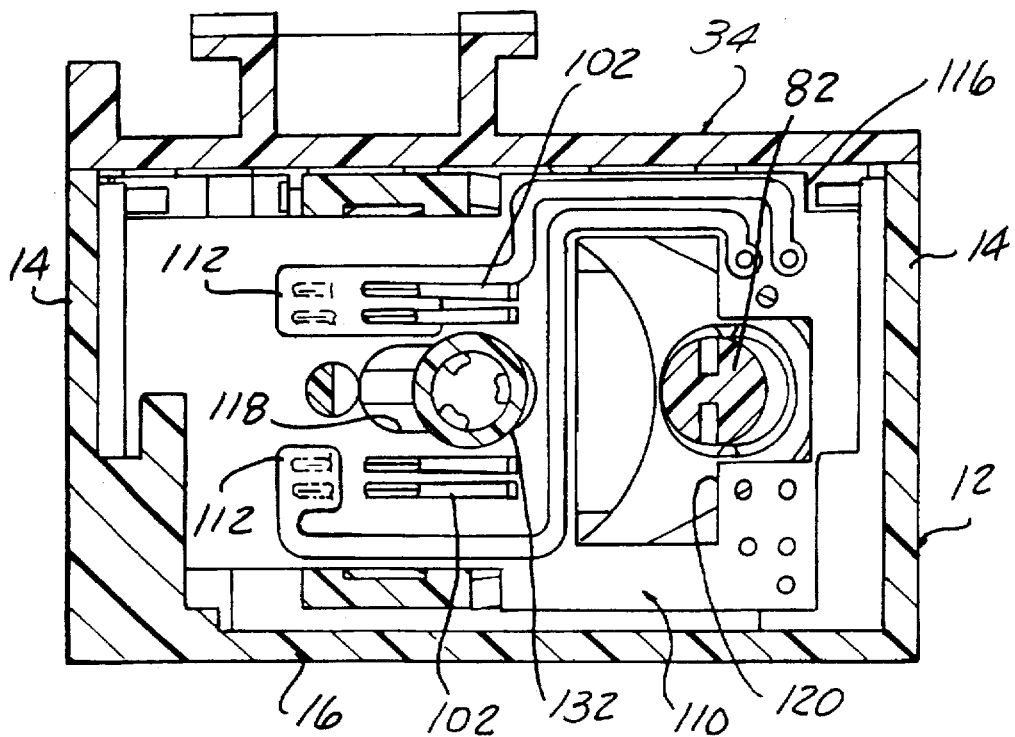
FIG. 5 is a cross sectional view generally taken along line 5—5 in FIG. 3.
Figure 6:
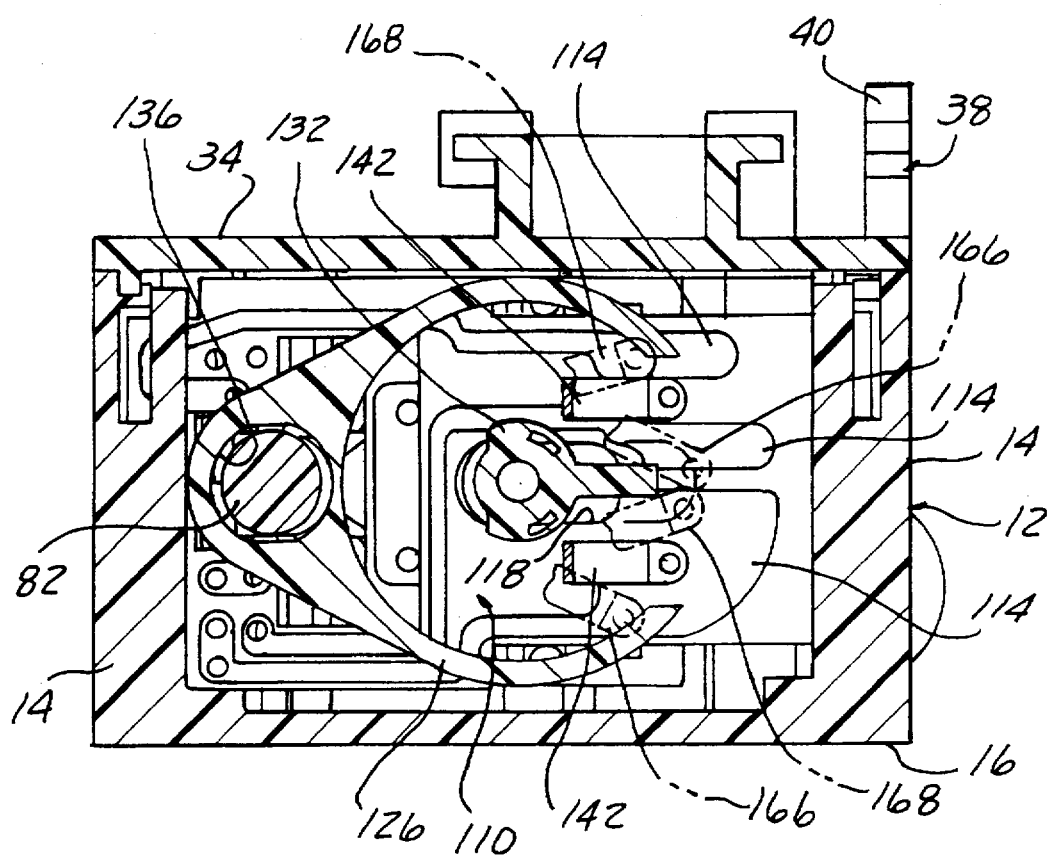
FIG. 6 is a cross sectional view generally taken along line 6—6 in FIG. 3.
Figure 7:
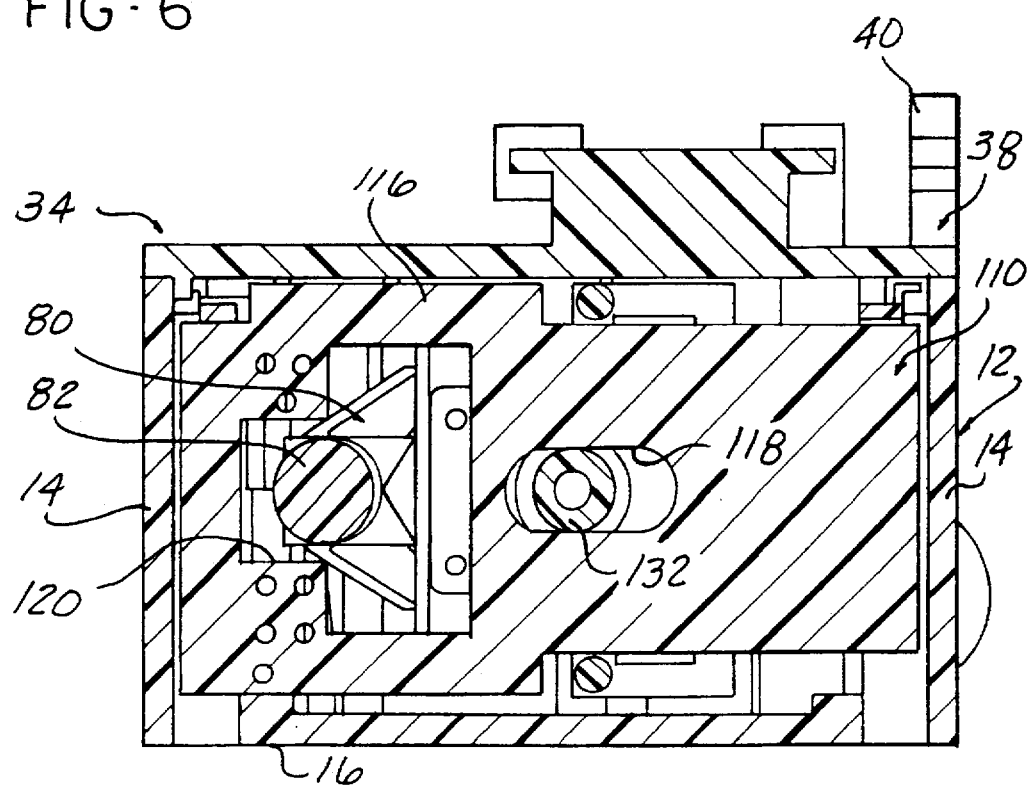
FIG. 7 is a cross sectional view generally taken along line 7—7 in FIG. 3.

As shown in FIGS. 1 and 2, and in greater detail in FIGS. 3, 5, 6, 8 and 9, a printed circuit board 110 is fixedly mounted in the housing 12. The printed circuit board 110 has a planar shape with a first set of electrically conductive traces 112 formed on a first surface shown in FIG. 5 and a second set of conductive traces 114 formed on a second, opposed surface as best seen in FIG. 6.

An outwardly extending side flange 116, shown in FIGS. 2 and 5, projects from one side edge of the printed circuit board 110 and forms a stop for one side wall 90 of the carrier 86 to limit movement of the carrier 86 in one direction along the circuit board 110. A first aperture 118 in the form of an elongated slot, as shown in FIGS. 5-9, is also formed in the printed circuit board 110. A second aperture 120 in the form of an irregularly shaped window is also formed in the printed circuit board 110 laterally spaced from the first aperture or slot 118. The function of the first and second apertures 118 and 120 will be described in greater detail hereafter.

As shown in FIG. 2, and in greater detail in FIGS. 4, 6, 8 and 9, a crank 126 is mounted in the housing 12 facing the second surface of the printed circuit board 110 carrying the second set of conductive traces 114. The crank 126 has a generally planar base 128 with a circular first end from which arcuate side walls extend toward the printed circuit board 110.

Connector means 130 are mounted on the base 128 of the crank 126. The connector means 130 generally is formed of a cylindrical, tubular member 132 mounted on and projecting outward from the base 128. The outer end of the tubular member 132 terminates in enlarged, notched fingers 134. In use, the tubular member 132 is slidably inserted through the first aperture 118 in the printed circuit board 110 and the bore 94 in the carrier 86, with the notched fingers 134 securely engaging the outer surface of the base 88 of the carrier 86 to join the crank 126 to the carrier 86 in a fixed positional relationship as shown in FIGS. 3, 8 and 9. In this mounting position, the carrier 86 and the crank 126 are disposed on opposite sides of the printed circuit board 110 and sandwich the circuit board 110 therebetween. However, the joined carrier 86 and crank 126 are capable of movement both laterally and rotationally, as described hereafter, about the stationarily positioned circuit board 110.

The extension spring 96 biases the carrier 86 to a neutral or centered position as determined by engagement of the tubular member 132 of the connector means 130 with one end of the slot 118 in the printed circuit board 110.

The second end of the crank 126 tapers to a smaller end shape and has an inward, tapered, conically shaped bore 136 extending therethrough as shown in FIGS. 2, 3, 4, 6 and 9. The bore 136 movably receives the tubular post 82 of the actuator 80 mounted on the gimbal ball 70.

Figure 4:
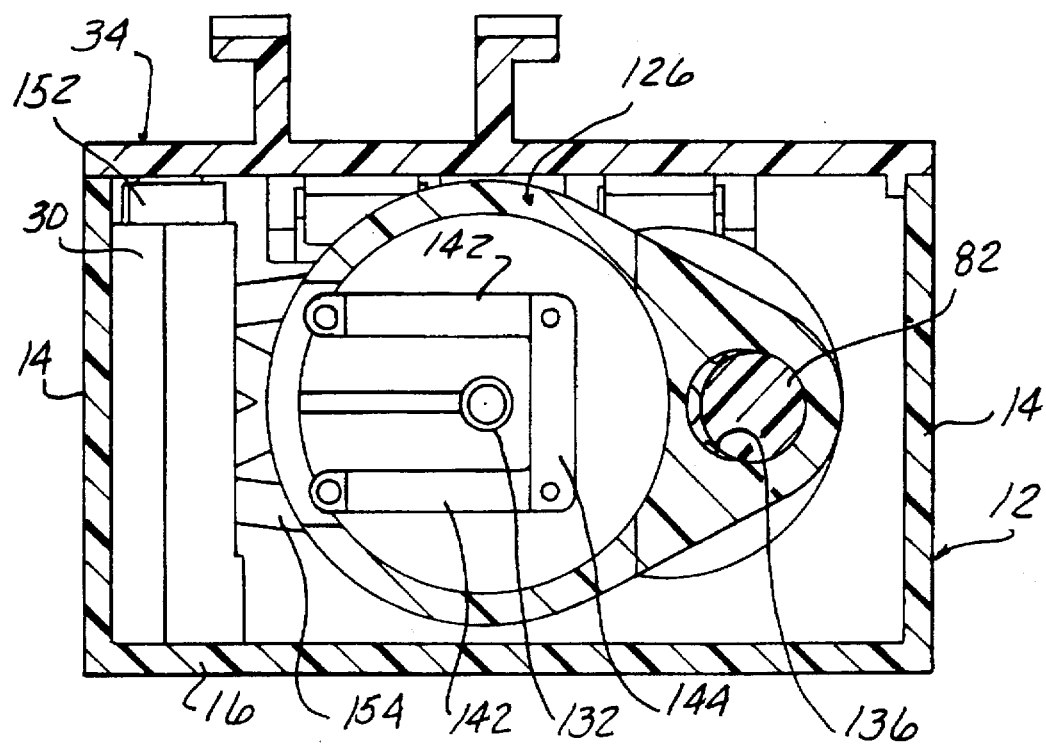
FIG. 4 is a cross sectional view generally taken along line 4—4 in FIG. 3.

A second electrical contactor 140, shown in FIGS. 2, 4, 6, 8 and 9 is fixedly mounted on the base 128 of the crank 126. The second contactor 140, by example, includes a pair of contacts 142 which cantilever from a base 144. As shown in FIG. 4, the arms of the second contacts 142 are disposed on opposite sides of the tubular member 132 on the crank 126.

A detent means shown in FIGS. 1-3 and 8 and denoted generally by reference number 150 is also disposed in the housing 12. The detent means 150 includes a mounting pin 152 which is rotatably disposed between the semi-circular members 30 in the housing 12. An arm 154 extends from the pin 152 through a slot formed between the outer ends of the semi-circular members 30.

A circular pad 156 is formed at the end of the arm 154 and includes a recess 158. A plurality of inward tapering grooves or slots 160 in the recess 158 form paths of movement for the end of the post 82 on the actuator 80 to control movement of the actuator 80 and the entire lever 44 in several different directions.

Any number of slots 160 may be formed in the recess 158 to define different paths of movement of the lever 44. In a exemplary embodiment, three slots 160 are formed in the recess 168, with two of the slots 160 being diametrically opposed and a third slot 160 interposed between tile diametrically opposed slots 160. A fourth slot 160 may be diametrically opposed to the third slot 160 if an additional path of movement is desired for the lever 44.

A biasing means, such as a coil spring 162, is mounted in a seat formed in one side wall 14 of the housing and engages the circular pad 152 to retain the detent means 150 in contact with the post 82 of the actuator 80.

The components of the steering column switch 10 are assembled in the positions described above and as shown in FIGS. 1-9. The post 82 on the actuator 80 extending from the gimbal ball 70 is passed through the second aperture 120 in the circuit board 110 and through the bore 136 and the crank 126 into engagement with the recess 158 in the detent means 150. The pivot pin 74 on the ball 70 is seated in the receiver 22 formed adjacent to the ball seat 20 in the bottom extension 18 of the housing 12. The top cover 34 is then mounted to the housing 12 and secured in position by means of fasteners. When the top cover 34 is so mounted, the pin 76 on the gimbal ball 70 is pivotally seated within a pin receiver formed in the top cover.

The lever 44 as well as the remaining components of the stalk switch 10 will assume a normal, deactivated position shown in FIG. 3. Before describing the operation of the stalk switch 10, by example, the electrical devices or vehicle functions controlled by the switchable positions of the first and second contactors 100 and 140 on the sets of conductive traces 112 and 114 provide a cancellation or deactivation of the vehicle cruise control circuit by movement of the first contactor 100, and resume cruise and cruise set functions upon movement of the lever 44 in either a clockwise or counterclockwise direction in the orientation shown in FIG. 3. Pushbutton assembly 50 mounted at the first end 48 of the lever 44 provides a signal to turn the cruise control circuit on or off. The electrical conductors connected to the pushbutton switch assembly 50 and the conductive traces on the printed circuit board 110 extend outward through an opening formed adjacent an end of one of the side walls 14 of the housing 12 as shown in FIG. 2 to a connection with the specific electrical circuit and/or device. It will be understood that the functions of the various contactors 100 and 140 as well as the pushbutton 50 may be redefined to operate other vehicle devices and/or circuits.

When it is desired to operate the vehicle cruise control, pushbutton 60 is depressed a first time. This switches the position of contacts in the switch 58 which close a circuit between conductive traces on the circuit board 52 to provide power to the vehicle cruise control circuit.

When the lever 44 is rotated downwardly about the pivot pin 74 toward the vehicle floor, the tubular post 82 on the actuator 80 extending from the gimbal ball 70 connected to the lever 44 will rotate in an opposite direction along one of the slots 160 in the recess 158 in the detent means 150. This rotation results in engagement of the tubular post 82 with the tapered bore 136 in the second end of the crank 126 thereby rotating the crank 126 about the tubular member 132. Since the notched fingers 134 at the end of the tubular member 132 are free to rotate about the outer surface of the base 90 of the carrier 86, the carrier 86 remains in a relatively stationary position.

Such rotation of the second end of the crank 125 results in movement of the contacts 142 on the second contactor 140 from the normal position shown in solid in FIG. 6 to a first operative position shown in phantom and depicted by reference number 166. In this position, the contacts 142 engage two of the conductive traces 114 on the circuit board 110 thereby enclosing an electrical circuit which sets a particular speed for the vehicle cruise control. Release of the lever 44 causes the tubular post 82 to rotate back to its normal position shown in FIG. 6 along one slot 160 in the recess 158 in the detent means 150. Rotation of the lever 44 in the opposite direction, but in the same plane as the above-described movement, about the pivot pin 74, causes the second end of the crank 126 to rotate in an opposite direction thereby switching the contacts 142 to a second operative position shown in phantom in FIG. 6 and depicted by reference number 168. In this position, the contacts 142 complete a circuit between other conductive traces 114 thereby providing an output signal to the vehicle cruise control which has been pre-established to resume a previously set cruise speed.

When the lever 44 is rotated in a clockwise direction in the orientation shown in FIG. 3, such as by being pulled toward the driver, such rotation of the lever 44 about the pivot pin 76 causes the actuator 80 to also move in a clockwise direction about pin 76 away from the normal position shown in FIG. 3. This rotation causes translation of the crank 126 due to the engagement of the post 82 in the bore 136 in the crank 126. The fixed connection of the crank 126 and the carrier 86 also moves the contacts 102 mounted on the carrier 86 from the position shown in solid in FIG. 5 to a second position shown in phantom in FIG. 5. In this second position, the contacts 102 open a circuit between two of the conductive traces 112 on the first surface of the printed circuit board 110 to provide a signal which, in the exemplary embodiment, cancels a previously set cruise speed. Although not shown in FIG. 5, rotation of the lever 44 away from the driver or in a counterclockwise direction in the orientation shown in FIG. 3, about the pivot pin 76 results in the actuator 80 sliding the crank 126, the carrier 86, and the contacts 102 in an opposite direction. Additional conductive traces on the first surface of the circuit board 100, not shown, can then be engaged by the contacts 102 to close a circuit providing a signal to a device on the vehicle, such as a signal to set a proximity detector.

It is also possible to arrange the components so that pivotal movement of the lever 44 toward the driver enables the spring 96 to shift the carrier 86 to the second position. In this arrangement, the detent grooves 160 and the detent spring 162 return the tubular member 80, the actuator 82 and the lever 44 to the central or center position after release by the driver.

Referring now to FIGS. 10–17, there is depicted another embodiment of a multi-function steering column stalk switch 210 according to the present invention. The multi-function steering column stalk switch 210, hereafter referred to as the stalk switch 210, includes a housing 212 generally having a one-piece construction formed of spaced top and bottom walls 213 and 214, respectively, opposed side walls 215 and 216, and a generally closed first end 217. A conical-shaped boot 218 is integrally formed on the first end 217 of the housing 212 and covers the end portion of a pivotal lever 44 as described hereafter. The end 219 of the housing 212 opposite the first end 217 is open and communicates with an open end portion 220 on the side wall 216. A cover 234 has a generally U-shape formed of a central end 236 and two opposed side legs 238 and 240. The side leg 240 is sized to cover a portion of the open end portion 220 on the side wall 216 when the cover 234 is releasibly joined to the housing 212. Outwardly extending tabs 221 on the side wall 215 engage notches 222 on the side leg 238 and a pair of notches 223 on side leg 240 engage a shoulder on a pair of fingers 225 extending from the side wall 216 to releasibly mount the cover 234 to the housing 212 thereby covering the open end 218 and a portion of the open end portion 220 on side wall 216 of the housing 212.

A latch and a slide are formed on the top wall 213 of the housing 212 to attach the housing 212 to a support, such as a bracket or housing on a vehicle steering column.

A lever 44 is pivotally mounted to the housing 212. As the lever 44 is substantially identical to the lever 44 described above and shown in FIGS. 1 and 2, the same reference numbers have been employed to depict the same components in both levers 44. A complete description of the construction and operation of the lever 44 may be had by referring to the previous description of the lever 44 in the prior embodiment of the present invention.

Generally, the first switch assembly 50 is mounted in the open first end of the lever 44. The first switch assembly 50 includes a printed circuit board 52 which is slidably mounted in slots extending inward from the second end 48 of the lever 44. A switch 56 is mounted on the printed circuit board 52 and includes a movable operator 58 which receives a pushbutton 60 in a snap-on connection. Movement of the pushbutton into the second end 48 of the lever 44 causes internal contacts in the switch 58 to change positions thereby making a connection between conductive traces on the printed circuit board 52. Conductors 62 extend from terminals connected to the traces on the first printed circuit board 52 through the lever 44 and into the housing 212 as described hereafter.

A gimbal ball 270 has a bore 271. An internal shoulder in the bore 271 receives latch fingers 273 on one end of the lever 44 to attach the lever 44 to the gimbal ball 270. Key flanges 275 on the lever 44 engage slots 272 in the bore 271 to position the lever 44 relative to the gimbal ball 270.

Figure 12:
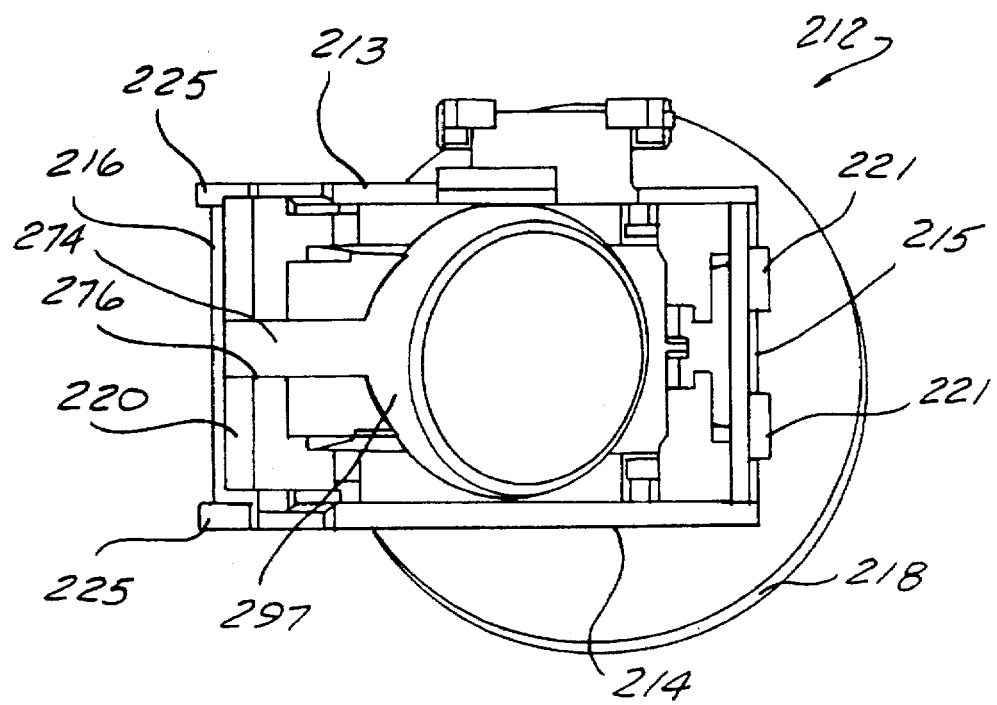
FIG. 12 is a left end view of the housing shown in FIG. 10.

A pivot pin 274 projects from the gimbal ball 270 and is loosely disposed in a slot 276 in the housing 212 as shown in FIG. 12. The pivot pin 274 forms a first pivot axis for pivotal movement of the lever 44 in a first plane perpendicular to a longitudinal axis extending through the pivot pin 274.

The lever 44 is also pivotal in a second, mutually separate plane generally perpendicular to the first plane since the pivot pin 274 is free to move laterally in the larger slot 276.

A detent plunger 280 having a generally cylindrical, tubular shape seats against a biasing spring 282 disposed in a bore formed in a tubular extension or actuator 283 extending from the gimbal ball 270. The purpose of the detent plunger 280 and the actuator 283 will become more apparent hereafter.

A one-piece connector 290 is mounted within the housing 212. The connector 290 has a pair of mounting legs 292 with latch ends which snap into a slot 293 in the side wall 215 of the housing 212 to releasibly mount the connector 290 in the housing 212. A pair of through-bores 294 extend through a side portion of the connector 290 to receive electrical terminals as described hereafter. A generally arcuate support 296 is formed on the connector 290 to provide a portion of a seat for the gimbal ball 270. The remainder of the gimbal ball seat is formed by a mating arcuate section 297 in the housing 212 as shown in FIG. 12.

Figure 10:
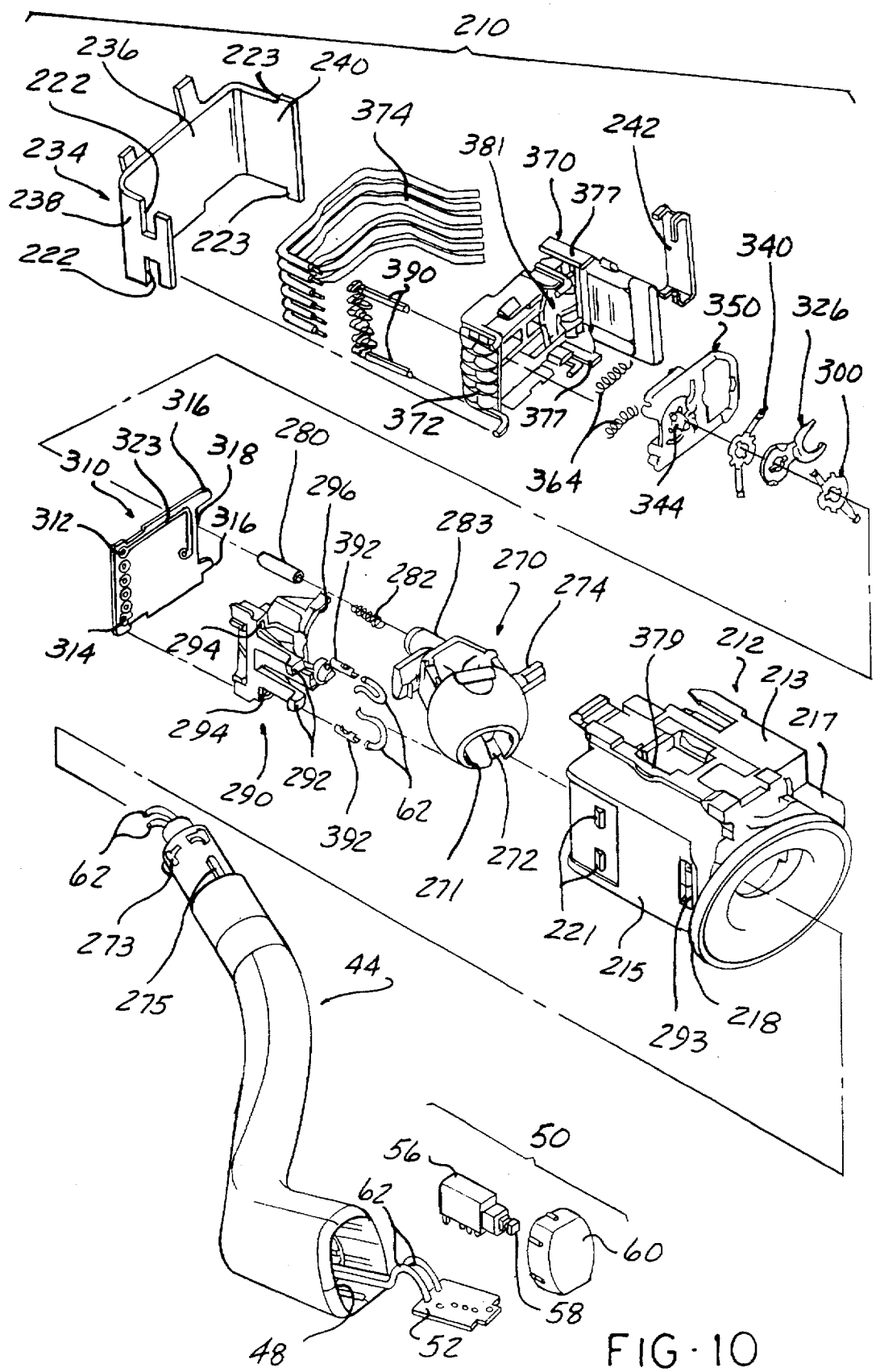
FIG. 10 is an exploded, perspective view of a multi-function steering column stalk switch according to another embodiment of the present invention.
Figure 11:
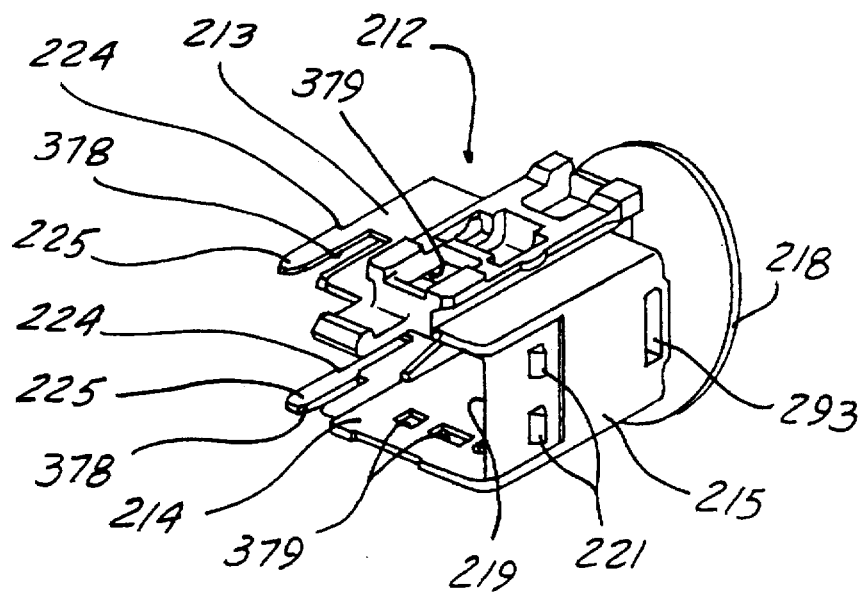
FIG. 11 is a rear perspective view of the housing shown in FIG. 10.
Figure 13:
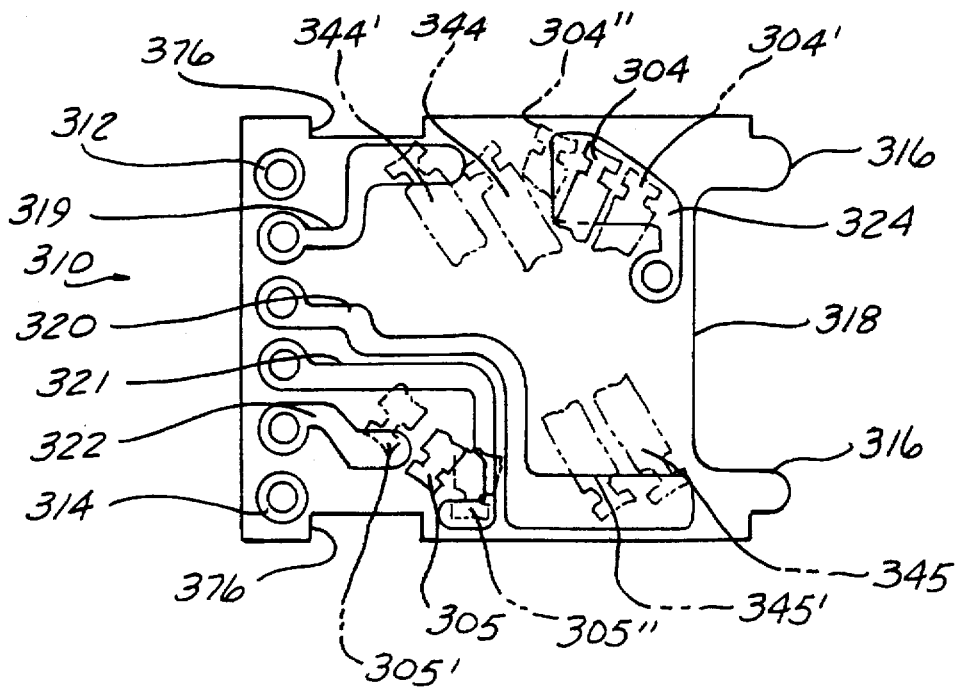
FIG. 13 is a rear inverted view of the second printed circuit board shown in FIG. 10.

A second printed circuit board 310, as shown in FIGS. 10 and 13, has a plurality of hollow mounting pads formed at one end. The mounting pads 312 and 314 disposed at outermost ends of the row of mounting pads receive electrical terminals therethrough as shown in FIG. 10 and described hereafter. Conductive traces 319, 320, 321 and 322 extend from the other mounting pads in a predetermined configuration to provide selectible contact with contactors during pivotal movement of the lever 44 as described hereafter.

Preferably, the second printed circuit board 310 is a two-sided printed circuit board having the conductive traces shown in FIG. 13 formed on one side or surface. A single conductive trace 323, shown in FIG. 10, is formed on the opposite or second side of the printed circuit board. The conductive trace 323 provides a voltage source to "feed" conductive trace 324 on the opposite side of the circuit board 310, as shown in FIG. 13.

A pair of fingers 316 project outwardly from a notch or recess 318 formed on an opposite side end of the second printed circuit board 310.

Figure 14:
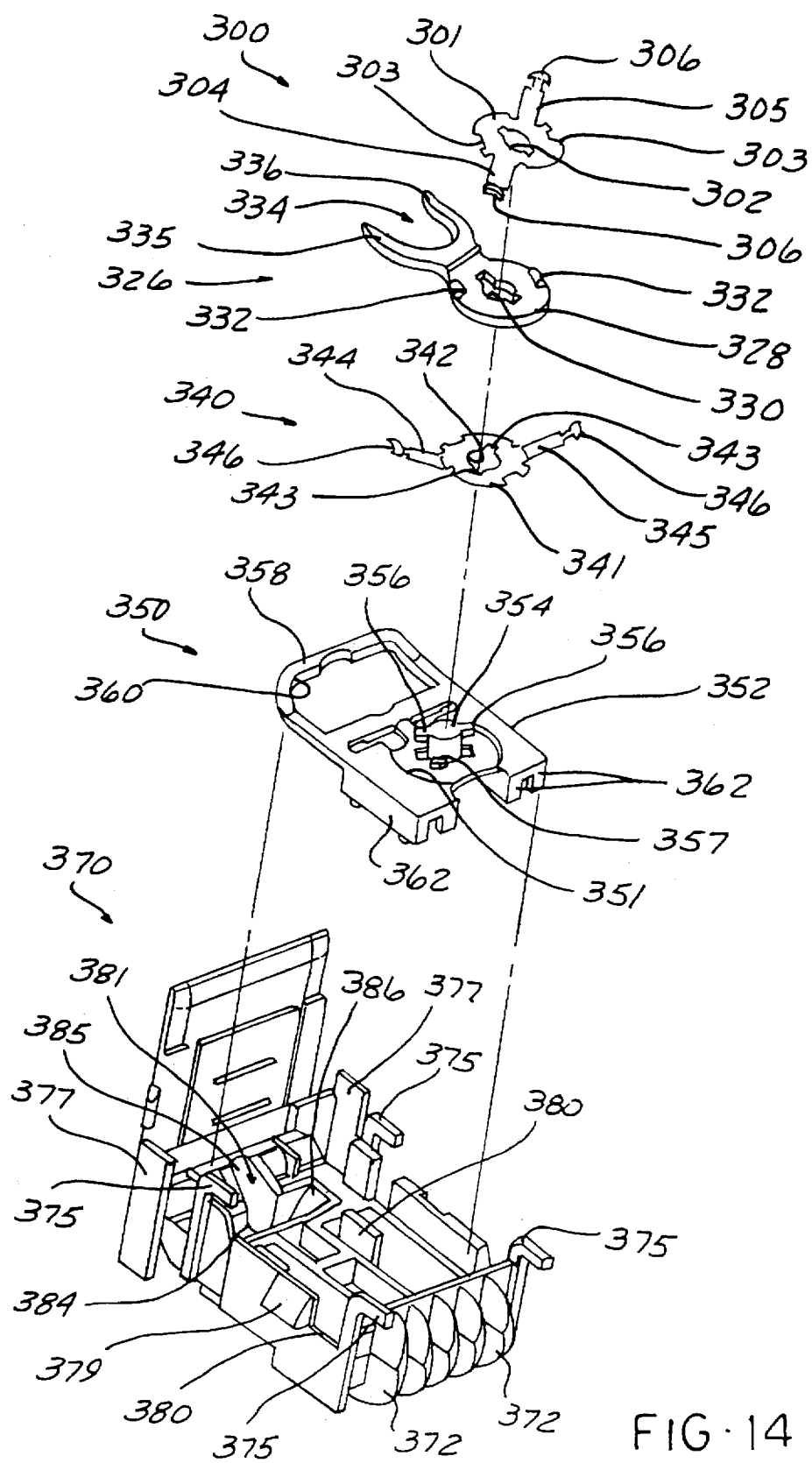
FIG. 14 is an enlarged, exploded perspective view of the carrier, the crank, and the first and second contactors shown in FIG. 10.
Figure 15:
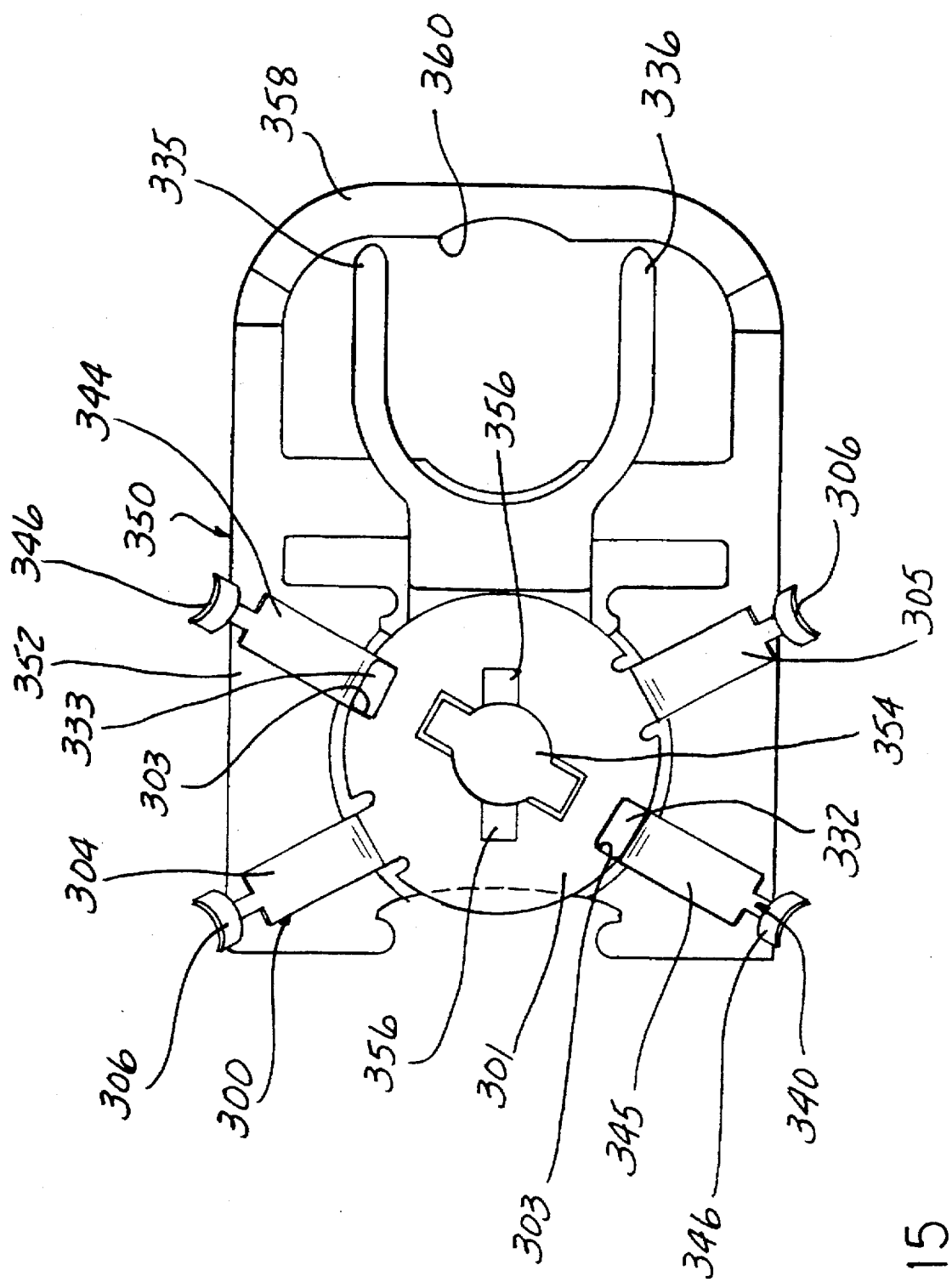
FIG. 15 is a front elevational view of an assembled carrier, crank, and first and second contactors shown in FIGS. 10 and 14.

A first contactor 300 shown in FIGS. 10, 14 and 15 has a generally annular base 301. An irregularly shaped mounting aperture 302 is formed in the base 301. A pair of opposed notches 303 are also formed in the periphery of the base 301. First and second contact arms 304 and 305 project angularly from the plane of the base 301 at a predetermined angle. A contact pad 306 is mounted at the end of each of the arms 304 and 305 for engaging certain conductive traces on the second printed circuit board 310 during movement of the first contactor 300 as described hereafter.

A crank 326 shown in FIGS. 10, 14 and 15 provides a mounting support for the first contactor 300. The crank 326 is formed with a generally circular base 328 having a mounting slot 330 formed centrally therein. A pair of key posts 332 are formed generally opposite from each other on the base 328. The key posts 332 engage the notches 303 in the first contactor 300 to key or orient the first contactor 300 to the crank 326.

A fork 334 projects from the base 328 and terminates in a pair of spaced fork legs 335 and 336. The actuator 283 extends through the fork legs 335 and 336 as described hereafter.

A second contactor 340 has substantially the same shape as the first contactor 300. The second contactor 340 has a generally annular base 341 with an irregularly shaped clearance slot 342 formed therein. A pair of opposed mounting notches 343 are formed in the slot 342. First and second contact arms 344 and 345 project angularly outward from the plane of the base 341 and terminate in contact pads 346 which are positioned for engaging certain conductive traces on the second printed circuit board 310.

A carrier 350 depicted in FIGS. 10, 14, 15 and 16 is formed with a generally planar base 352. A mounting post 354 with outwardly extending fingers 356 projects from one side of the base 352. The fingers 356 serve to movably retain the first and second contactors 300 and 340 and the crank 326 on the carrier 350. A pair of diametrically opposed tabs 357 are formed on the base 352 adjacent to the post 354. The tabs 357 provide a keyed, angular mounting for the second contactor 340 in a recess 351 in the base 352 of the carrier 350.

An angularly raised bale 358 extends from the base 352. An internal aperture 360 is formed between the base 352 and the bale 358 and underlays the legs 335 and 336 of the fork 334 on the crank 326. The actuator 283 extends through the aperture 360.

Figure 19:
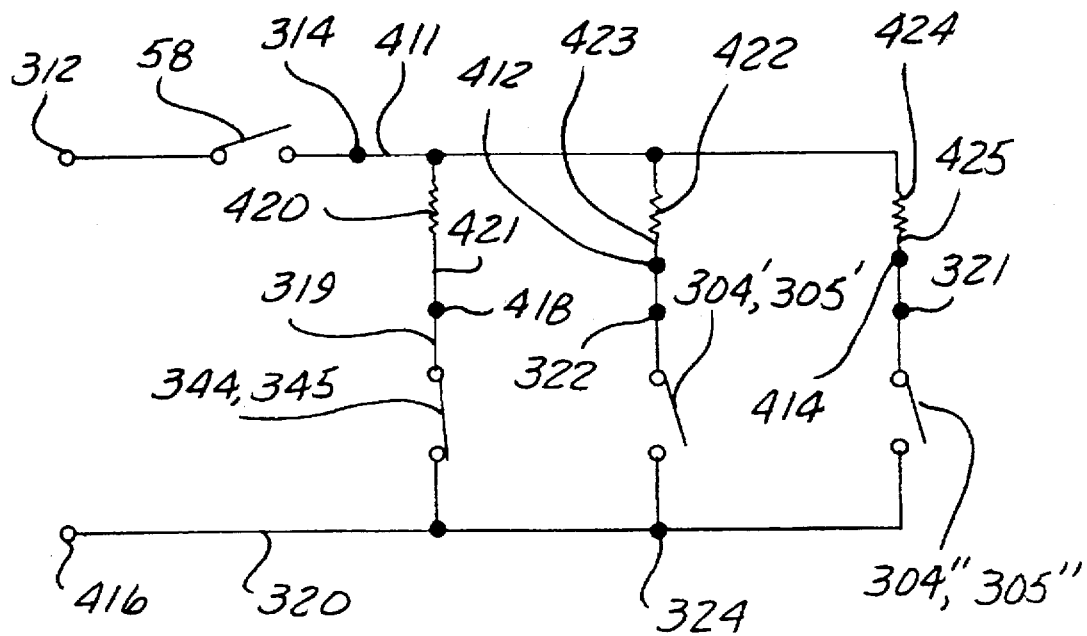
FIG. 19 is a schematic diagram of the circuit formed by the printed circuit shown in FIG. 18 and the switchable contactors.

The mounting slot 330 in the crank 326 and the mounting aperture 302 in the first contactor 300 are aligned with the fingers 356 on the post 354 and inserted therepast on top of the second contactor 340. The notches 303 on the first contactor 300 are then engaged with the key posts 332 on the crank 326 to key and fix the angular position of the first contactor 300 to the crank 326 for movement therewith. Since the crank 326 is oriented generally in line with the longitudinal extent of the carrier 350 by the actuator 283, the first and second contactors 300 and 340 are angularly offset from each other as shown in FIG. 19.

Figure 16:
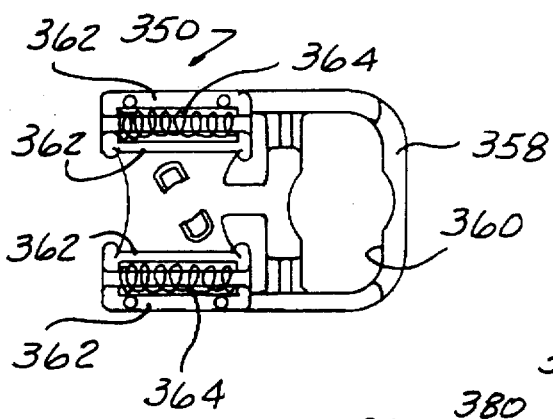
FIG. 16 is a rear elevation view of the carrier shown in FIG. 10.

As shown in FIG. 16, two pairs of spaced ribs 362 are mounted on the opposite side of the base 352 and form holders for biasing springs 364. The biasing springs 364 seat against flanges extending between each pair of ribs 362. Slots formed between the flanges receive ribs 382 as described hereafter. The biasing springs 364 normally bias the carrier 350 to a center position while enabling pivotal movement of the lever 44, described hereafter, to overcome the biasing force of the springs 364 and move the carrier 350 to a second position linearly spaced from the first center position.

Figure 17:
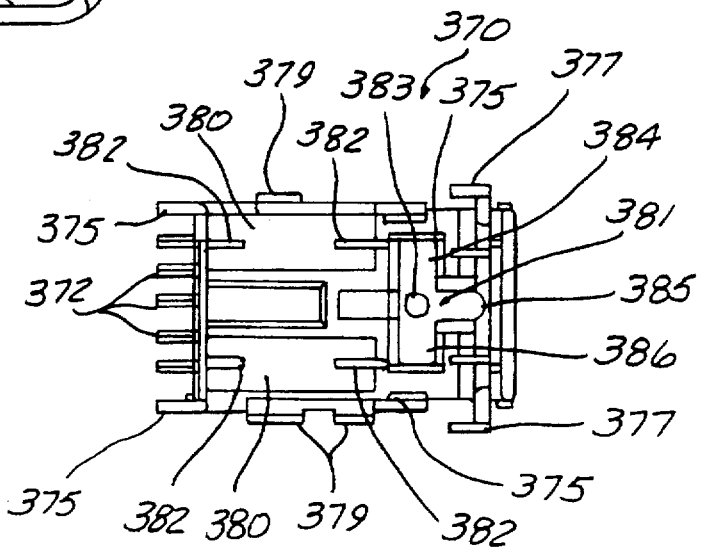
FIG. 17 is a front elevational view of the detent block, also shown in FIG. 10.

The stalk switch 210 also includes a detent block denoted generally by reference number 370 in FIGS. 10, 14 and 17. The detent block 370 is formed with an end wall and four opposed, interconnected side walls surrounding an internal cavity.

A plurality of spaced wire guides 372 extend along the end wall and two opposed side walls for receiving the individual wires of a wire harness 374.

Two pairs of fingers 375 extend from the side walls and form notches which receive fingers 316 and edges of a pair of notches 376 on the second printed circuit board 310. A pair of wings 377 extend from the end wall and engage recesses 378, shown in FIG. 11, in the top and bottom walls 213 and 214 of the housing 212. In addition, latches 379 on two opposed side walls of the detent block 370 engages apertures 379 in the top and bottom walls 213 and 214 of the housing 212 to securely position the detent block 370 in the housing 212.

Further, a pair of recesses 380 are formed in the detent block 370 and receive the biasing springs 364 and spring holders on the carrier 350. Ribs 382 extend into the recesses 380 and engage the springs 364 to normally position the springs 364 and the attached carrier 350 in a first position.

A detent 381 is formed in the detent block 370. The detent 381 includes a center position 383 and three angularly extending ramps 384, 385 and 386, One end of the detent plunger 280 normally engages the center position 383 on the detent 381. Pivotal movement of the lever 44 is converted by the gimbal ball 270 into pivotal movement of the detent plunger 280 in one of two mutually exclusive first and second planes. In the first plane in which the lever 44 is generally pivoted in either direction perpendicular to the axis of the pivot pin 274, the detent plunger 280 rides along the ramps 384 and 386. Since the ramps 384 and 386 are angled from the center position 383, release of the lever 44 enables the detent plunger 280 to move back toward the center position 383 thereby returning the lever 44 to a normal, non-pivoted position. Pivotal movement of lever 44 in the opposite or second plane from the first plane causes the detent plunger 280 to ride along the ramp 385.

As shown in FIG. 10, a pair of elongated, generally cylindrical terminals 390 are connected to two of the wires in the wire harness 374. The terminals 390 extend through the two outermost mounting pads 312 and 314 on the second printed circuit board 310 and the bores 294 in the connector 290. The ends of the terminals 390 are connected to mating terminals 392 connected to one end of the conductor 62 extending from the first switch 50 at the first end of the lever 44. This connects the conductive traces on the first printed circuit board 52 as switched by the first switch 50 to the conductive traces and/or electrical power source on the second printed circuit board 310. The wire harness 374 exits the stalk switch outer housing in a conventional manner.

A clip 242 or other holder, such as a shrink wrap tube, engages the wire harness 374 exiting the housing 212 adjacent to the end of the side leg 240 of the cover 234 to hold the wire harness 374 in position in the housing 212.

The operation of the stalk switch 210 shown in FIG. 10 and described above is substantially identical to the operation of the stalk switch 10 of the previously described embodiment of the present invention. Thus, the identical operation of the stalk switch 210 will not be described in detail herein except to point out differences between the two embodiments.

In operation, when the lever 44 is rotated downwardly about the pivot 274 toward the vehicle floor, the detent plunger 280 will pivot along the ramp 384 in the detent 381. The actuator 283 pivots into engagement with the leg 335 of the fork 334 on the crank 326 and pivots the crank 326 as well as the first contactor 300 in one angular direction. During such rotation, only the first contactor 300 is moved into an operative position in that the contact pads at the ends of the first and second arms 304 and 305 move from a center position into engagement with two conductive traces 324 and 322 on the second printed circuit board 310 completing a circuit therebetween, as shown by reference numbers 304' and 305' in FIG. 13. When the lever 44 is released, the biasing spring 282 forces the detent plunger 280 in an opposite direction along the ramp 384 back to the center position 383 thereby moving the lever 44 back to the normal, center position. In this position, contact arm 305 does not contact any conductive trace on the circuit board 310.

Rotation of the lever 44 in an opposite upward direction with respect to the vehicle floor, but in the same plane about the pivot pin 74, causes the actuator 283 to engage the opposite leg 336 of the fork 334. This results in pivotal movement of the crank 326 in an opposite angular direction thereby rotating the position of the arms 304 and 305 of the first contactor 300 to positions 304" and 305" into connection with conductive traces 324 and 321 on the second printed circuit board 310 thereby completing a different electrical circuit connected by wires in the wire harness 374 to the conductive trace 321.

Finally, when the lever 44 is pulled toward the driver thereby rotating about an axis perpendicular to the axis of the first pivot pin 274, the actuator 283 engages the end 358 of the carrier 350 thereby linearly moving the carrier 350 from a first center position to a second translated position. This moves both the first and second contactors 300 and 340 in a linear manner, but only the contact pads 306 on the contact arms 344 and 345 of the second contactor 340 are brought out of bridging engagement with conductive traces 320 and 319 as shown in phantom by reference numbers 344' and 345' in FIG. 13 on the second printed circuit board 310 to open an electrical circuit therebetween.

Figure 18:
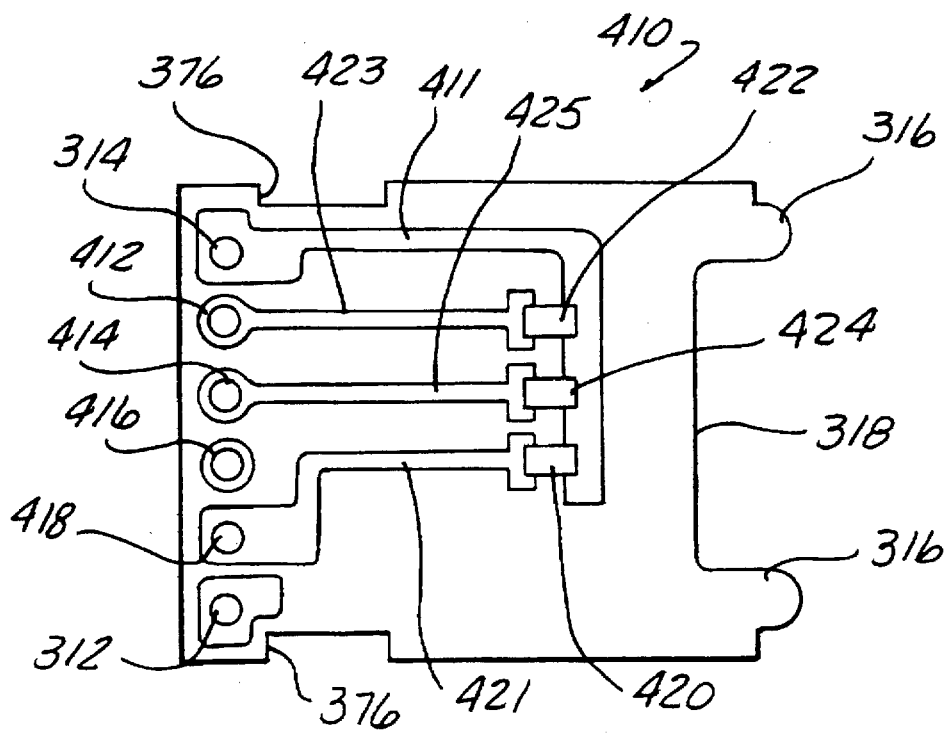
FIG. 18 is a front view of the second printed circuit board constructed in accordance with another embodiment of the present invention.

FIGS. 18 and 19 depict an alternate embodiment of the control circuitry formed by the conductive traces on a the printed circuit board 410 and the switchable contactors 300 and 340. The second or rear surface of the printed circuit board 410, shown in FIG. 18, is substantially identical to the rear surface of the printed circuit board 310 described above and shown in FIG. 13. The only difference is that the conductive trace 320 is connected to the conductive pad or trace 324. In this embodiment, there is no direct interconnection of a conductive trace on the front surface to the conductive trace 324 on the rear surface of the printed circuit board as in the embodiment described above and shown in FIG. 13.

In this alternate embodiment, as shown in FIG. 18, a conductive trace 411 extends from the mounting pad 314. A plurality of parallel connected resistors 420, 422 and 424 are connected to the conductive trace 411. Separate conductive traces 421, 423 and 425 respectively extend from the resistors 420, 422 and 424 to mounting pads 418, 412 and 414 on the printed circuit board 410. The mounting pads 418, 412 and 414 are connected through the printed circuit board 410 to the conductive traces 319, 322 and 321, respectively on the rear surface as shown in FIG. 13.

The switching action of the on/off pushbutton 58 and the first and second contactors 300 and 340 is the same as the first embodiment described above and shown in FIG. 13. However, the unique parallel resistor circuit shown in FIGS. 18 and 19 requires only two conductors extending from the entire steering column stalk switch as compared to the six separate conductors in the wiring harness 374 of the prior embodiment. The closing or opening of a circuit by the contactors 300 and 340 will connect one of the resistors 420, 422 and 424 between the two power conductors. The resulting voltage drop or change in current through the connected resistor will be sensed by control circuitry in the master cruise control unit on the vehicle which can then determine which of the contacts has closed or opened and thereby take appropriate control action.

In summary, there has been disclosed a multi-function steering column stalk switch having a unique contactor mounting structure which provides an efficient means to implement switching upon pivotal movement of the lever in separate planes.

What is claimed is:
1. A switch apparatus comprising:
  a housing;
  a lever mounted in the housing for pivotal movement in a first plane about a first pivot axis and for pivotal movement in a second mutually exclusive plane about a second pivot axis;
  circuit means, disposed in the housing, for forming a plurality of electrical conductive traces;
  a first contactor movably disposed with respect to the circuit means for movement from a first position to a second position completing an electrical circuit between two of the conductive traces on the circuit means;
  a second contactor movably disposed with respect to the circuit means for movement from a first position to a second position completing an electrical circuit between two of the conductive traces on the circuit means; and
  actuator means, carried by and movable with movement of the lever, for moving the first contactor to the second position upon movement of the lever in one direction in the first plane and for moving the second contactor to the second position upon movement of the lever in one direction in the second plane.

2. The switch apparatus of claim 1 further comprising:

support means for supporting the first contactor for movement, the actuator means engaging the support means upon movement of the lever in one direction in the first plane.

3. The switch apparatus of claim 2 wherein the support means supports the first contactor for movement in a second direction, the first contactor contacting different conductive traces on the circuit means when moved in the second direction.

4. The switch apparatus of claim 2 wherein:

the support means supports the second contactor for movement, the actuator means engaging the support means upon movement of the lever in one direction in the second plane.

5. The switch apparatus of claim 1 further comprising:

support means for supporting the second contactor for movement in one direction in the second plane, the actuator means engaging the support means upon movement of the lever in one direction in the second plane.

6. The switch apparatus of claim 1 wherein:

a gimbal ball is carried at one end on the lever and rotatably mounted in the housing;

the first and second pivot axes are formed between the gimbal ball and the housing; and the actuator means includes an actuator extending from the gimbal ball.

7. The switch apparatus of claim 6 further comprising:

support means for supporting the first contactor for movement in opposed directions, the first contactor contacting different conductive traces on the circuit means when moved in the opposed directions;

the support means supporting the second contactor for movement in a first direction; and the actuator engagable with the support means upon movement of the lever in the first and second planes.

8. The switch apparatus of claim 7 wherein:

the first and second contactors are circumferentially offset with respect to each other.

9. The switch apparatus of claim 7 wherein the support means comprises:

a first member carrying the first and second contactors;

a second member supporting the first member;

biasing means for biasing the second member to a normal first position;

first actuator engaging means, carried on the first member, for engagement with the actuator upon movement of the actuator in one direction in the first plane to move the first member from the first position; and second actuator engaging means, carried on the second member, for engagement with the actuator upon movement of the actuator in one direction in the second plane to move the second member from the first position.

10. The switch apparatus of claim 1 wherein the circuit means comprises:

a printed circuit board having a plurality of conductive traces formed on at least one surface.

11. The switch apparatus of claim 10 wherein the circuit means comprises:

a plurality of resistors mounted on the printed circuit board, at least one resistor electrically connected to one conductive trace on the printed circuit board for varying the current through the one conductive trace when one of the first and second contactors is connected to the one conductive trace;

a pair of electrical conductors connected to and extending externally from two of the conductive traces on the printed circuit board; and the resistors and certain conductive traces connected in parallel with one of the pair of electrical conductors.

12. The switch apparatus of claim 10 further comprising:

pads carried on the circuit board;

at least two of the pads having a through bore extending therethrough;

a plurality of conductors extending externally of the lever; and terminals connected to at least two of the conductors, the terminals extending through the bores in the at least two pads into engagement with the housing.

13. The switch apparatus of claim 1 wherein:

the actuator means linearly moves the first contactor between the first and second positions upon movement of the lever in the first plane;

the actuator means rotating the second contactor between the first and second positions upon movement of the lever in the second plane.

14. A switch apparatus comprising:

a housing detachable a lever moving column;

a lever movably attached to the housing for movement in at least one plane;

a circuit board stationarily mounted in the housing and carrying a plurality of conductive traces on at least one surface;

first and second members mounted on opposite sides of the circuit board and coupled together for unitary movement;

first contact means carried on the first member for engaging conductive traces on the circuit board in response to movement of the first member;

second contact means carried on the second member for engaging conductive traces on the circuit board in response to movement of the second member;

an actuator carried with the lever and engagable with the first and second members; and means, coacting between the actuator and the first and second members, for moving the first member to switch the first contact means between conductive traces on the circuit board in response to movement of the lever in one direction and for moving the second member to switch the second contact means between conductive traces on the circuit board in response to movement of the lever in another direction.

15. The switch apparatus of claim 14 wherein the coacting means comprises:

the first member mounted for linear movement in the housing.

16. The switch apparatus of claim 14 wherein the coacting means comprises:

the second member mounted for rotation in the housing.

17. The switch apparatus of claim 14 further comprising:

connector means for joining the first and second members;

a first aperture formed in the circuit board; and the connector means extending through the first aperture and disposed for lateral movement in the first aperture.

18. The switch apparatus of claim 14 further comprising:

a second aperture formed in the circuit board;

the actuator passing freely through the second aperture into engagement with the second member for rotating the second member about the connector means.

19. The switch apparatus of claim 14 further comprising:

a gimbal ball carried at one end of the lever;

first pivot means, coacting between the housing and the gimbal ball, for pivotally mounting the lever for movement in a first plane with respect to the housing; and second pivot means, coacting between the housing and the gimbal ball, for pivotally mounting the lever for movement in the second plane with respect to the housing.

20. The switch apparatus of claim 17 wherein the connector means comprises:

a tubular member carried with and extending from the second member;

an aperture formed in the first member and receiving the tubular member therein; and lock means, carried on the tubular member and engagable with the first member to fixedly join the first and second members together.

21. A switch apparatus comprising:

a housing detachable to a steering column;

a lever movably attached to the housing for movement in at least one plane;

a circuit board stationarily mounted in the housing and carrying a plurality of conductive traces on at least one surface;

first and second electrical contactors, each having at least one contact arm extending therefrom, the first and second electrical contactors coupled together fox unitary movement across the plurality of conductive traces on the circuit board;

means, movably disposed within the housing, for supporting the first and second electrical contactors for at least one of bi-directional linear movement and bi-directional rotative movement;

an actuator carried with the lever and engagable with the supporting means; and means, coacting between the actuator and the supporting means, for moving the supporting means in a linear direction upon movement of the lever in one direction and to rotate the supporting means upon movement of the lever another direction.

22. The switch apparatus of claim 21 wherein the supporting means comprises:

a first member mounted for linear movement in the housing; and a second member, coupled to the first member, and mounted for independent rotation with respect to the first member.

23. The switch apparatus of claim 22 wherein the supporting means further comprises:

the first member having a first engagement portion engaged by the actuator upon movement of the actuator in one direction; and the second member having at least one engagement portion engagable by the actuator upon movement of the actuator in another direction.

24. The switch apparatus of claim 23 wherein:

the second member has two spaced engagement portions, each engaged by the actuator upon movement of the actuator in opposed second directions.

* * * * *